May 5, 1925.
R. P. LIER
1,536,111
COMBINED CARRIER AND BUMPER FOR AUTOMOBILES
Filed Sept. 23, 1924
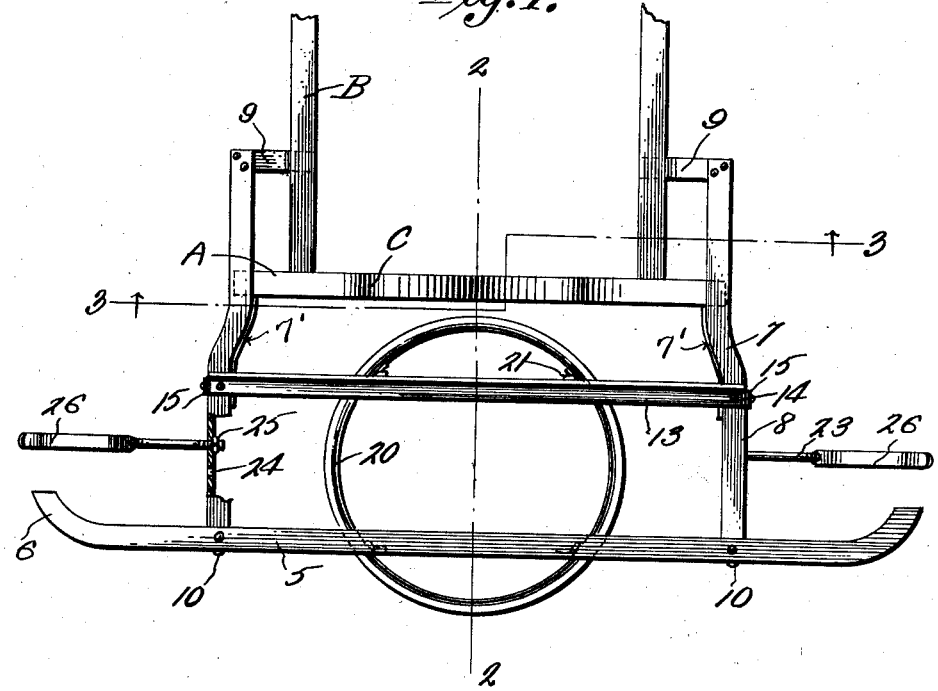
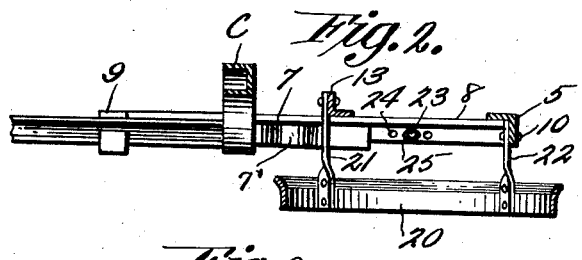
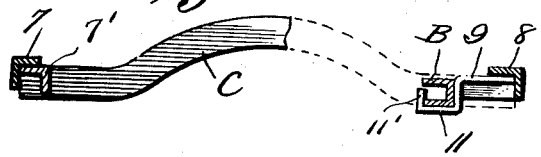
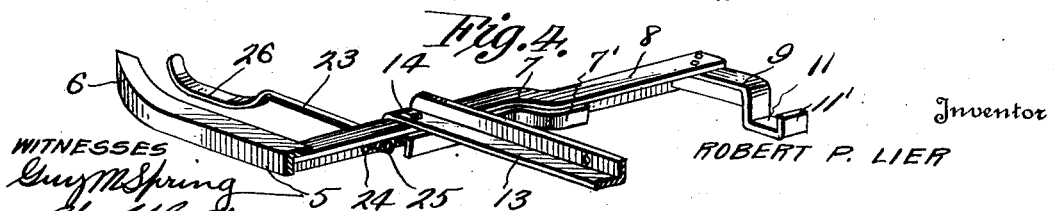
WITNESSES
Inventor
ROBERT P. LIER
By
Attorney Patented May 5, 1925.

1,536,111

UNITED STATES PATENT OFFICE.

ROBERT P. LIER, OF MITCHELL, SOUTH DAKOTA.

COMBINED CARRIER AND BUMPER FOR AUTOMOBILES.

Application filed September 23, 1924. Serial No. 739,417.

*To all whom it may concern:*

Be it known that I, ROBERT P. LIER, a citizen of the United States, residing at Mitchell, in the county of Davison and State of South Dakota, have invented certain new and useful Improvements in Combined Carriers and Bumpers for Automobiles, of which the following is a specification.

The present invention appertains to a combined carrier and bumper designed particularly for Ford automobiles and has for its principal object to provide a very simple and efficient device of this nature which may be easily and quickly fastened directly to the frame of the chassis of a Ford automobile without the necessity of using any bolts or other like fastening elements and when so attached may be used for the purpose of a tire carrier, support for rear fender, support for rear bumper, and as a luggage carrier.

The invention also contemplates the provision of a device of this nature which is reliable for the uses mentioned and is strong, durable, inexpensive to manufacture, light, attractive in appearance, and otherwise well adapted to the purpose for which it is designed. These and other objects I attain by the construction shown in the accompanying drawings, wherein for the purpose of illustration is shown a preferred embodiment of my invention and wherein:

Figure 1 is a top plan view of the device embodying the features of my invention showing the same attached to portions of the rear end of a Ford automobile chassis.

Figure 2 is a section taken therethrough substantially on the line 2—2 of Figure 1, Figure 3 is a transverse section taken substantially on the line 3—3 of Figure 1, and Figure 4 is a detail perspective view showing one half of the apparatus.

Referring to the drawing in detail it will be seen that B designates the side rails of an automobile chassis which are connected at their rear ends by an arch member C having projections A which extend beyond the side rails B. A bumper 5 constructed preferably of angle iron is provided with curved terminals 6. A pair of substantially L-shaped bracket bars 7 including long arms 8 and short arms 9 have the ends of their long arms attached to intermediate portions of the bumper as at 10 while the ends of their shorter arms 9 terminate in substantially U-shaped stirrups 11. Extension lips 11' are provided on the stirrups 11. These stirrups receive the side rails B of the chassis and it is to be noted that intermediate portions of the longer arms 8 of the bracket bars 7 are offset inwardly so as to rest upon the projections A of the end arch members C of the chassis. Angle iron 7' brace these offsets and are arranged so that their inner ends engage the ends of the arch member C for preventing inward displacement of the device. Thus the bumper and bracket arms are supported in place without the necessity of using any bolts or other like fastening elements. A cross rail 13 extends between the bars 7 resting thereon and riveted or otherwise fastened thereto as at 14. It is preferable that the ends 15 of this rail 13 be extended over and down alongside of the bars 7 so as to prevent them from spreading.

A tire carrier 20 of the usual annular construction is hung by means of rods 21 and 22 from the rail 13 and bumper 5 respectively. Fender bracing rods 23 are extended through openings 24 in the bars 7 being held in place by nuts 25. There are preferably several of the openings 24 in each of the bars 7 so that these rods 23 may be adjusted in relation thereto. The rods 23 terminate in curved flattened portions 26 conforming to the contour of the end of the fenders so as to fit inside thereof. Thus the fenders will be braced effectively and considerable undesirable vibration eliminated.

From the above description it will be quite evident that the device affords a very efficient bumper of simple construction which may be attached to the chassis of a Ford automobile without the necessity of using bolts or other similar fastening elements which might become sheared or otherwise broken when shocks are transmitted to the bumper 5. It will also be seen that the device acts as an efficient tire carrier and that the spare tire is carried in a horizontal position beneath the bumper out of the way and yet is readily accessible. The device also efficiently braces the rear portion of the chassis and a suit case or similar luggage may be supported on the rails 13 and bumper 5 being held thereon by means of straps or in any other suitable manner.

For the purpose of illustrating my invention, I have shown in the accompanying drawings, one form thereof which is at present preferred by me, since the same will give in practice satisfactory and reliable results, although it is to be understood that the various instrumentalities of which my invention consists may be variously arranged and organized and my invention is not limited to the precise arrangement and organization of these instrumentalities as herein shown and described.

Having thus described my invention, what I claim as new is:

1. A device of the class described including in combination, a chassis formed with a pair of side rails and an end cross rail connected thereto and projecting therebeyond, a pair of L-shaped bracket arms terminating in stirrups for receiving the side rails, the intermediate portions of these arms resting on the ends of the end rail, and a bumper attached to the rear extremities of the arms.

2. A device of the class described including in combination, a chassis formed with a pair of side rails and an end cross rail connected thereto and projecting therebeyond, a pair of L-shaped bracket arms terminating in stirrups for receiving the side rails, the intermediate portions of these arms resting on the ends of the end rail, a bumper attached to the rear extremities of the arms, a rail extending across the arms, and a tire carrier supported below the last mentioned rail and bumper.

3. A device of the class described including in combination, a chassis formed with a pair of side rails and an end cross rail connected thereto and projecting therebeyond, a pair of L-shaped bracket arms terminating in stirrups for receiving the side rails, the intermediate portions of these arms resting on the ends of the end rail, a bumper attached to the rear extremities of the arms, a rail extending across the arms, a tire carrier supported below the last mentioned rail and bumper, and a pair of fender bracing members supported on the arms and terminating in curved flattened portions to fit within the fenders.

4. A device of the class described including in combination, a chassis formed with a pair of side rails and an end rail connected thereto and extending therebeyond, a pair of bracket arms of L-shaped construction to provide long members and short members, the short member terminating in a stirrup to receive the rails, and a bumper supported on the ends of the long members, the intermediate portions of the long members being rested on the ends of the end rail of the chassis.

5. A device of the class described including in combination, a chassis formed with a pair of side rails and an end rail connected thereto and extending therebeyond, a pair of bracket arms of L-shaped construction to provide long members and short members, the short member terminating in a stirrup to receive the rails, a bumper supported on the ends of the long members, the intermediate portions of the long members being rested on the ends of the end rail of the chassis, a cross bar supported on the bracket arms and having its ends curved over the side edges thereof, and a tire carrier supported below the brace bar and the bumper.

6. A device of the class described including in combination, a chassis formed with a pair of side rails and an end rail connected thereto and extending therebeyond, a pair of bracket arms of L-shaped construction to provide long members and short members, a short member terminating in a stirrup to receive the rails, the bumper supported on the ends of the long members, the intermediate portions of the long members being rested on the ends of the end rail of the chassis, a cross bar supported on the bracket arms and having its ends curved over the side edges thereof, a tire carrier supported below the brace bar and the bumper, and fender bracing members extending from the bracket arms and terminating in flattened curved portions.

7. A device of the class described including in combination a chassis comprising a pair of side rails and an end rail connected thereto and projecting therebeyond, a pair of L-shaped bracket bars including long arms and short arms, said short arms terminating in stirrups to receive the side rails, said long arms being offset intermediate their ends and rested on the ends of the end rail, a bumper on the ends of the long arms of the bracket bars, a brace rod extending across the bracket bars and having its ends curved over the sides thereof and affixed thereto, a tire carrier, hanger rods depending from the brace rod and the bumper for supporting the tire carrier therebelow, a pair of fender bracing members one fixed to each of the bracket bars, each member terminating in a flattened portion adapted to be received in the fenders of an automobile.

8. A device of the class described for attachment to a vehicle chassis embodying a pair of spaced side rails connected by an end cross rail, comprising a pair of bracket bars adapted to rest intermediate their ends on the cross rail having lateral inner arms adapted to engage the under sides of said side rails, and means rigidly connecting said bars.

In testimony whereof I affix my signature in the presence of two witnesses.

ROBERT P. LIER.

Witnesses:
P. M. YOUNG,
R. A. TOWNSEND.